UNITED STATES PATENT OFFICE.

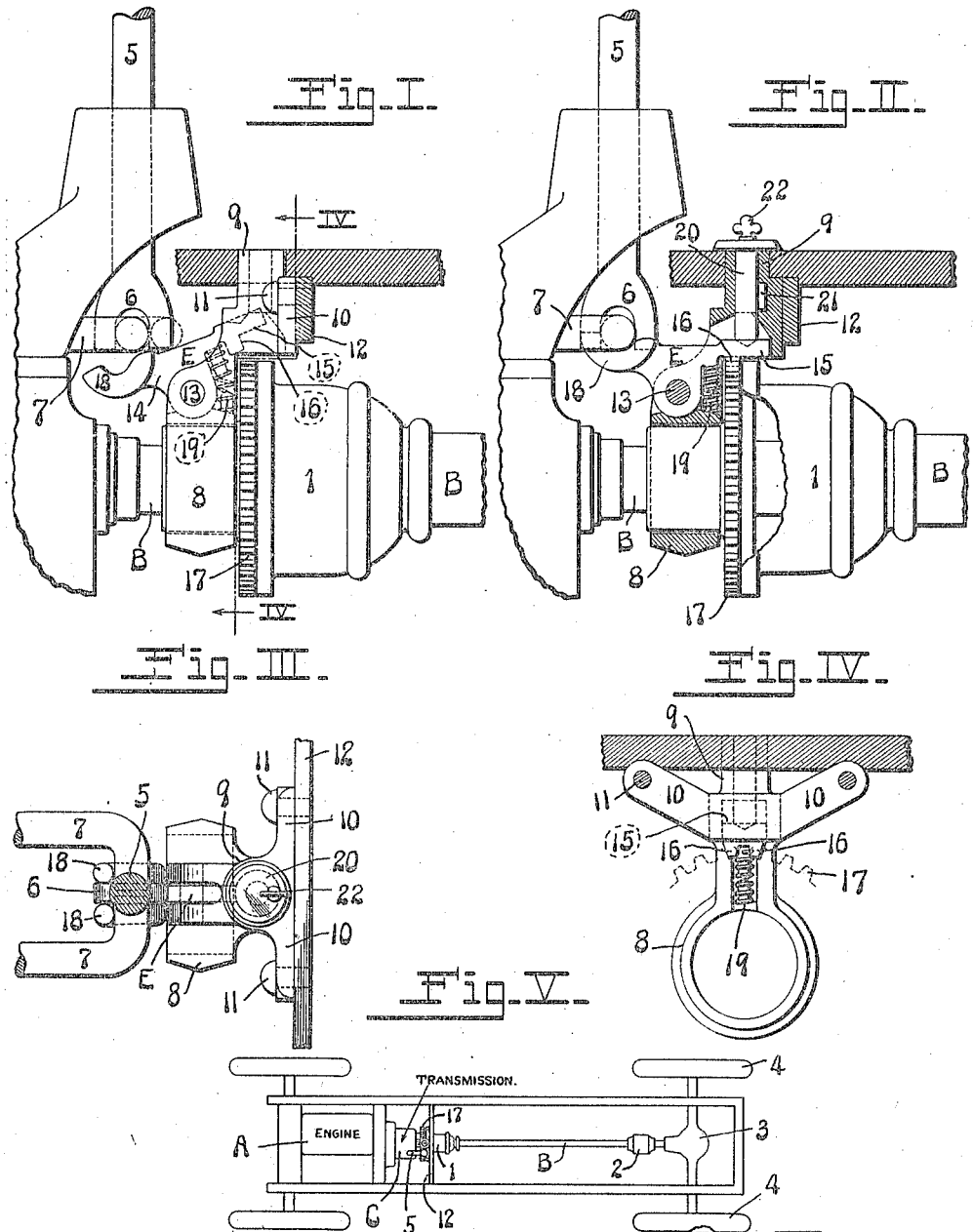

HARRY P. MAMMEN, OF SPRINGFIELD, OHIO.

AUTOMOBILE-LOCK.

1,267,887.　　　　Specification of Letters Patent.　　Patented May 28, 1918.

Application filed August 13, 1917. Serial No. 185,929.

*To all whom it may concern:*

Be it known that I, HARRY P. MAMMEN, a citizen of the United States of America, a resident of Springfield, in the county of Clark, State of Ohio, have invented certain new and useful Improvements in Automobile-Locks, of which the following is a full, clear, and exact description, reference being had to the accompanying drawings, forming a part of this specification.

My invention relates to improvements in automobile locks, one of the objects being to provide a simple and inexpensive means for locking the traction wheels of an automobile, so as to prevent the vehicle from being towed when the lock is in service. Another object is to lock the power transmission device in its neutral condition, thereby preventing the transmission of power from the engine to the drive shaft.

In the preferred form of the invention, both of these objects are attained by a simple locking device provided with a latch for securing the power transmission device in its neutral position, and also having a latch for locking the drive shaft. When the lock is in service, the drive shaft is locked to prevent the traction wheels from turning, the transmission device being locked to prevent the transmission of power from the engine to the drive shaft. By locking both the transmission device and drive shaft, the rear ground wheels are locked against rotation, and even though the engine is started the locked transmission device will prevent the transmission of power to the drive shaft. The automobile cannot be injured by starting the engine while the lock is in service, power cannot be transmitted from the engine to the locked drive shaft, and since the traction wheels are geared to the drive shaft the danger of theft by towing the vehicle is eliminated.

Figure I is a fragmentary view showing the locking device associated with the drive shaft and the speed changing device of an automobile.

Fig. II is a view similar to Fig. I showing the locking device in its operative position.

Fig. III is a plan view, partly in section, showing the lock in its operative position.

Fig. IV is a vertical section taken approximately on the line IV—IV, Fig. I, the drive shaft being omitted.

Fig. V is a diagrammatical view of an automobile, showing the relative positions of the engine, transmission device, drive shaft and locking device.

The automobile herein shown (Fig. V) is provided with an engine A, a drive shaft B and a transmission device C for transmitting power from the engine to the drive shaft. I do not deem it necessary to show the details of the engine and transmission device, for such devices are well known in the art, and they may be constructed in any suitable manner. The drive shaft B includes universal joints located at the points designated 1 and 2 for the purpose of connecting the different shaft sections. The usual differential gearing may be located at 3 (Fig. V) for the purpose of transmitting power from the drive shaft to the traction wheels 4. The transmission device may be actuated to change the speed of the vehicle relative to the engine and to disconnect the engine from the drive shaft B, as is well understood in the art.

The transmission device herein shown is provided with a manually operated speed changing lever 5, forked at its lower end as indicated at 6, to receive gear shifting rods 7, the latter being turned laterally at their ends, as shown most clearly in Fig. III. The lever 5 may be shifted laterally from one rod 7 to the other, and said lever may be actuated to move either of the rods 7 from the neutral position shown by full lines in Fig. I to the position shown by dotted lines. When the parts 5, 6 and 7 occupy the positions shown by full lines in the drawings the transmission device is in its neutral position and power cannot then be transmitted from the engine to the drive shaft.

The locking device herein shown comprises a latch holder provided with a ring 8 surrounding the drive shaft, a tubular bolt receiving member 9 formed integral with said ring, and wings 10 extending from the member 9. This latch holder is permanently secured to the automobile by means of the ring 8 surrounding the drive shaft and also by rivets 11 passing through the wings 10 and secured to a bar 12, which forms part of the frame of the machine. E designates a double latch device pivotally connected at 13 to the latch holder and preferably provided with latch arms 14 and 15. 16 designates teeth extending downwardly from the latch arm 15 and adapted to interlock with a gear wheel 17 fixed to the drive shaft B. The latch arm 14 is preferably provided with a pair of curved fingers 18, adapted to receive the ends of the gear shifting rods 7, said fingers 18 being separated from each other (Fig. III) to receive the fork 6 at the lower end of the gear shifting lever 5. A spring 19 tends to retain the double latch device in the inoperative position shown in Fig. I, wherein it does not in any way interfere with the speed changing device nor with the drive shaft B. When both gear shifting rods 7 and the lever 5 occupy their neutral positions the double latch holder E may be shifted from the inoperative position shown in Fig. I to the operative position shown in the other views of the drawing. When the latch device E occupies its operative position its curved fingers 18 partly surround the ends of the rods 7 to retain both of said rods in their neutral positions; the lower end of the shifting lever 5 is confined between said curved fingers so that the lever can not be moved from its neutral position, and the teeth 16 interlock with the gear wheel 17 to prevent the drive shaft from rotating.

The means for locking the latch device E in its operative position comprises a bolt 20 adapted to be inserted into the tubular portion 9 of the latch holder (Fig. II) so as to engage the latch arm 15 and thereby retain the latch device in its operative position. The bolt 20 is secured by means of a key controlled lock including a member 21 (Fig. II) adapted to be projected into a recess in the latch holder. A key 22, separable from the bolt 20, may be actuated to release the various locking elements, and the bolt 20 may then be removed from the machine. When the bolt 20 is withdrawn the spring 19 will quickly move the latch device to its inoperative position, wherein it will be retained until the bolt 20 is again inserted into the latch holder.

When the transmission device is not in its neutral position power can be transmitted from the engine to the drive shaft B in the usual manner, and one of the gear shifting rods 7 will then occupy the position shown by dotted lines in Fig. I. The shifted rod 7 will then lie in the path of the latch arm 14 so as to retain the latch device in its inoperative position the object being to prevent the drive shaft B from being locked by the teeth 16 when either of the gear shifting rods 7, is shifted from its neutral position. If the drive shaft could be locked while the transmission device is not in its neutral position it would be possible to transmit power from the engine to the locked drive shaft, and this might result in serious injury to the mechanism. It is therefore an advantage to construct and arrange the elements of the locking device in such a manner that the drive shaft cannot be locked while the transmission device is not in its neutral position.

When the locking device is in service the gear wheel 17 fixed to the drive shaft B is locked by the teeth 16, and since this locks the drive shaft B it will be apparent that the traction wheels 4 are also locked. This prevents the automobile from being towed. The engine can then be started and permitted to run idly, but it cannot transmit power to the drive shaft for the reason that the transmission device is locked in its neutral position.

I claim:—

1. In a locking device for an automobile having a drive shaft and power transmission device for transmitting power to said shaft, the combination of a shaft fastening device preventing rotation of the drive shaft, a transmission latch whereby the transmission device is secured to prevent the transmission of power to the drive shaft, said transmission latch being adapted to retain the transmission device in its neutral position, both the transmission latch and shaft fastening device being inoperative when the transmission device is not in its neutral position, and key controlled locking means common to said transmission latch and shaft fastening device.

2. In a locking device for an automobile having a drive shaft and power transmission device for transmitting power to said shaft, the combination of a shaft fastening device preventing rotation of the drive shaft, and a transmission latch associated with said shaft fastening device so as to latch the transmission device thereby preventing the transmission of power to the drive shaft, said transmission latch being movable into the path of a portion of the transmission device so as to secure the latter in its neutral position, and said shaft fastening device including a rotary member arranged to be actuated with the drive shaft and a latch movable into the path of said rotary member.

3. In a locking device for an automobile having a drive shaft and power transmission device for transmitting power to said shaft, the combination of a transmission latch for the transmission device and a shaft latch for preventing the rotation of the drive shaft, said transmission latch including a latch member movable into the path of a portion of the transmission device, said shaft latch including a rotary member arranged to be actuated with the drive shaft and a latch member movable into the path of said rotary member, and a locking means whereby both of said latch members are secured in their operative positions.

4. In a locking device for an automobile having a drive shaft and power transmission device for transmitting power to said shaft, the combination of a transmission latch for the transmission device and a shaft latch for preventing the rotation of the drive shaft, said transmission latch including a latch member movable into the path of a portion of the transmission device, said shaft latch including a rotary member arranged to be actuated with the drive shaft and a latch member movable into the path of said rotary member, a yielding device tending to retain said latch members in their inoperative positions, and locking means whereby both of said latch members are secured in their operative positions.

5. In a locking device for an automobile having a drive shaft and power transmission device for transmitting power to said shaft, the combination of a transmission latch for the transmission device and a shaft latch for preventing the rotation of the drive shaft, said latches comprising a latch holder adapted to be permanently secured to the vehicle, a latch member secured to said holder and movable into the path of a portion of the transmission device to hold the latter in its neutral position, a second latch member also secured to said holder, a rotary member arranged to be actuated with said drive shaft, said second latch member being movable into the path of said rotary member, and locking means associated with said latch holder to secure both of said latch members in their operative positions.

6. In a locking device for an automobile having a power transmission device provided with a pair of shiftable speed changing members and a lever for actuating both of said members, a latch arm, a pivot for securing said latch arm adjacent to said speed changing members and lever, the pivotally secured latch arm being forked to receive the lower end of said lever and recessed to receive portions of speed changing members, said latch arm being movable into the paths of both of said speed changing members and also into the path of said lever so as to secure said parts in their neutral positions, and locking means whereby said latch arm is prevented from turning on its pivot and thereby secured in its operative position.

7. In a locking device for an automobile having a drive shaft and a power transmission device for transmitting power to said shaft, the combination of a transmission lock for the transmission device and a shaft lock for preventing rotation of the drive shaft, said locks comprising a latch holder, means for securing said latch holder to the automobile, a rotary member movable with said drive shaft, a double latch device pivoted to said latch holder and provided with a latch arm movable into the path of a portion of the transmission device to retain the latter in its neutral position, said double latch device also having a latch arm movable into the path of said rotary member to prevent rotation of the drive shaft, and means coöperating with said double latch device to lock both latch arms in their operative positions.

8. In a locking device for an automobile having a drive shaft and power transmission device for transmitting power to said shaft, the combination of a transmission lock for the transmission device and a shaft lock for preventing the rotation of the drive shaft, said locks comprising a latch holder surrounding the drive shaft, means, in addition to the drive shaft, for permanently securing said latch holder to the automobile, a gear wheel secured to the drive shaft, a double latch device pivoted to said latch holder and provided with a latch arm movable into the path of a portion of the transmission device to retain the latter in its neutral condition, said double latch device also having a latch arm movable into the path of the teeth on said gear wheel to prevent rotation of the drive shaft, a spring tending to retain said latch arms in their inoperative positions, a bolt fitted to said latch holder and coöperating with said double latch device so to retain both latch arms in their operative positions, said bolt being detachable from the latch holder, and a lock whereby said bolt is secured in the latch holder.

In testimony that I claim the foregoing I hereunto affix my signature.

HARRY P. MAMMEN.